(12) United States Patent
Hugot et al.

(10) Patent No.: US 8,276,809 B2
(45) Date of Patent: Oct. 2, 2012

(54) SMART PHONES WITH WEB BASED INTERFACES

(75) Inventors: Didier Hugot, Meudon (FR); Gabriel Rangoni, Meudon (FR)

(73) Assignee: Gemalto SA, Meudon (FR)

( * ) Notice: Subject to any disclaimer, the term of this patent is extended or adjusted under 35 U.S.C. 154(b) by 532 days.

(21) Appl. No.: 11/884,246

(22) PCT Filed: Feb. 10, 2006

(86) PCT No.: PCT/IB2006/000257
§ 371 (c)(1),
(2), (4) Date: Aug. 13, 2007

(87) PCT Pub. No.: WO2006/085201
PCT Pub. Date: Aug. 17, 2006

(65) Prior Publication Data
US 2008/0142586 A1    Jun. 19, 2008

(30) Foreign Application Priority Data

Feb. 14, 2005 (EP) ..................................... 05290328

(51) Int. Cl.
*G06F 17/00* (2006.01)

(52) U.S. Cl. ........ 235/375; 235/380; 455/418; 455/420; 455/424; 455/425

(58) Field of Classification Search .................. 235/380, 235/375; 455/418, 420, 424, 425, 558
See application file for complete search history.

(56) References Cited

U.S. PATENT DOCUMENTS

| | | | |
|---|---|---|---|
| 6,611,849 B1 * | 8/2003 | Raff et al. .............................. | 1/1 |
| 6,891,811 B1 * | 5/2005 | Smith et al. ................... | 370/310 |
| 2002/0021696 A1 * | 2/2002 | Minborg ....................... | 370/392 |
| 2006/0113379 A1 * | 6/2006 | Cricco .......................... | 235/380 |
| 2009/0298542 A1 * | 12/2009 | Lord ............................. | 455/558 |

FOREIGN PATENT DOCUMENTS

| | | |
|---|---|---|
| EP | 0 964 562 A1 | 12/1999 |
| EP | 1 211 861 A1 | 6/2002 |
| EP | 1 434 450 A1 | 6/2004 |
| EP | 2004/052034 A1 | 6/2004 |
| WO | WO-00/69191 | 11/2000 |

OTHER PUBLICATIONS

Linden, Mikael, Method for Utilizing Local Resources in a Communication System, Mar. 30, 2000, WIPO.*
Zeiger, Stefan, Servlet Essentials, Nov. 4, 1999, http://www.novocode.com/doc/servlet-essentials/.*
Zeiger, Stefan, Servlet Essentials, Nov. 4, 1999, http://www.novocode.com/doc/servlet-essentials/chapter1.html.* International Search Report for PCT/IB2006/000257 mailed May 23, 2006 (3 pages).
S. Guthry, How to Turn a GSM SIM into a Web Server—Projecting Mobile Trust onto the World Wide Web; Smart Card Research and Advanced Applications. IFIP Working Conference on Smart Card Research and Advanced Applications Sep. 20, 2000, (13 pages).

* cited by examiner

*Primary Examiner* — Michael G Lee
*Assistant Examiner* — Tabitha Chedekel
(74) *Attorney, Agent, or Firm* — Osha Liang LLP

(57) ABSTRACT

In general, the invention relates to a system that includes a smart phone and a smart card. The smart phone includes a web browser and a display for displaying a web page, where the web page includes at least one selectable entry. The smart card includes at least one proactive logic entity, where the at least one proactive logic entity is configured to respond to selection of the at least one selectable on the web page.

11 Claims, 1 Drawing Sheet

SMART PHONES WITH WEB BASED INTERFACES

FIELD OF INVENTION

The present invention concerns smart phones with means for increasing the control of telecommunication operators and of their subscribers over certain smart phone's features such as the phone book.

BACKGROUND

Before the advent of the Internet, telephones were dedicated devices, in the sense that they served a defined purpose and were not customizable. With the advent of the Internet, we have witnessed a convergence of personal computing and telecommunications. Computing capabilities (for example, loading and execution of custom Java applets such as games, calendar management, etc.) and Internet browsing features have been added to telecommunication devices (such as fixed and mobile phones). At the same time, communication capabilities (such as IrDA, USB, IEEE 1394, Ethernet, WiFi, CDMA or GSM) have been embedded in laptop computers or personal digital assistants (PDA).

A special category of devices, which we will call "smart phones" in the rest of the document, consists of devices that support at least cellular networking (for example GSM) and Internet browsing, and which cooperate with a smart card (for example a SIM) for controlling access to the cellular network.

A smart phone usually has a smart phone phone book.

A phone book includes a plurality of entries, each entry including at least an identifier (such as a person's name, a service name or the identification of any other communicating third parties). Each phone book entry is usually associated with at least one phone number, usually stored in the phone book.

An entry comprises a displayable part, which is distinguishable on the display of the smart phone and selectively actuated by an interface equipment of the smart phone, which interface equipment is preferably a keypad, a miniature joystick, a rolling mechanism, etc.

The subscriber can, upon selection of a phone book entry, automatically dial one of the phone numbers associated with the phone book entry, or send an SMS to this phone number.

The smart card usually has a smart card phone book, which is similar to the smart phone phone book but is stored in the smart card instead of the smart phone. In this document, "regular phone book" will refer to the smart card phone book and smart phone phone book taken together. Those two phone books' entries can be complementary, or might overlap in whole or in part. In other words, certain entries of the regular phone book can be stored in the smart card, others in the smart phone, and some may be stored in both.

The smart phone contains a piece of proprietary software enabling navigation through the regular phone book. Consequently, the regular phone book is normally displayed according to proprietary methods defined by each smart phone manufacturer.

The smart phone can also browse the Internet using an industry standard protocol called WAP (Wireless Application Protocol). The smart phone can thus browse yellow pages web sites in order to seek a person, and locate the desired phone number inside a web page of the yellow page web site. Such phone numbers are usually associated with a hyperlink (or with another area or section of the page, such as hot spots), and this hyperlink can usually be clicked in order to call the number automatically (thanks to a special WAP tag inside the hyperlink).

Smart cards may also have known features enabling them to request a specific command, such as a phone call, to be executed by the smart phone. For example, for a SIM card, this can be done through the standard SIM Toolkit API, which specifies a series of proactive commands.

Proactive commands will be hereafter considered as commands sent by the smart card to the smart phone. Such commands are called proactive due to the fact that they reverse the usual situation in which the smart phone is a master device and the smart card is a slave device. While normal commands are sent from the smart phone to the smart card, proactive commands are sent in the opposite direction (from smart card to smart phone). SIM Toolkit is the preferred mechanism for implementing such proactive commands.

The smart card may also support TCP/IP and HTTP protocols, and be able to host a web server, as known from state-of-the-art (e.g. BULL CP8 I-Simplify product). This enables storage of web pages inside the card and access to those pages through Internet protocols (the smart phone can browse the web pages stored in the smart card).

The Open Mobile Alliance (OMA) has specified (notably in OMA SyncML Common v 1.2 and in OMA Data Synchronization Enabler Release, version 1.2) synchronization methods, which achieve the following goals (citation from page 8 of OMA-ERELD-SyncML-DS-V 1_2-20040601-C):

"The goal of a common synchronization protocol is symmetric. It would connect any to any, over any network That is, it would: *Synchronize networked data with any mobile device *Synchronize a mobile device with any networked data The data synchronization protocol would synchronize networked data with many different devices, including handheld computers, mobile phones, automotive computers, and desktop PCs. A user could access and manipulate the same set of data from different devices. For example, a user could read e-mail from either a handheld or a mobile phone, and still maintain a consistent, updated record of which messages had been read. Similarly, with any-to-any synchronization, mobile devices could support more types of data, including e-mail, calendar, contact management information, enterprise data stored in databases, and documents on the web."

Smart cards are not part of the mobile devices explicitly listed in this standard.

Another relevant technology known from state of the art consists of industry standard servlets. Servlets are described by SUN Microsystems as follows (http://java.sun.com/products/serylet/).

"Java Servlet technology provides Web developers with a simple, consistent mechanism or extending the functionality of a Web server and for accessing existing business systems. A servlet can almost be thought of as an applet that runs on the server side—without a face. Java servlets make many Web applications possible."

One limitation of state-of-the-art smart phones lies in the fact that while a phone call initiated through WAP is done in a standard manner (the web page and the web page navigation are independent of the type of smart phone), it is the smart phone manufacturer who defines the way a phone number is searched in the regular phone book and the way this number is called when the call is initiated from the regular phone book. Consequently, the subscribers of a cellular network operator will have different ways of making regular phone book initiated phone calls depending on the smart phone they own, and they will have to learn a different way to make a regular phone book initiated phone call each time they switch to a different smart phone. In addition, subscribers are bound by the built in features of the regular phone book browser (provided in the smart phone), usually without freedom to customize this regular phone book according to their taste.

Cellular network operators would therefore prefer to have a unified method, both for ease of use and marketing reasons (the operator prefers to own the customer relationship—not to leave it to the smart phone manufacturer). Indeed, a unified method would decrease the visibility of smart phone manufacturers by rendering them equivalent with respect to the regular phone book initiated phone call making process, while it could still increase the visibility of the operator (for example through particular default fonts or colors, which, optionally, could be freely changed by the subscriber if he wishes so).

Another limitation of state-of-the-art smart phones is the fact that cellular networking features and personal computing features remain in separate units despite the technology convergence mentioned above. The personal computing unit does not invoke the telecommunication unit automatically, except in rare instances such as web pages with specially crafted WAP tags permitting automatic dialing of a selected number, as discussed earlier (yellow pages).

SUMMARY

It is therefore an object of the present invention to ease the process of making regular phone book initiated phone calls and to increase the control of the operator over this process, by letting the operator define this process himself, in a uniform manner (independent of the smart phone).

It is another object of the invention to let the subscriber launch actions normally managed by the telecommunication unit of the smart phone or any action requiring a smart card proactive command, from the personal computing unit of the smart phone (for example from a web page displayed by the web browser of the personal computing unit).

According to one aspect of the invention, the regular phone book is complemented or replaced (i.e. the regular phone book can be maintained or removed) by a web phone book, which includes at least one web page, the web phone book's web pages being stored preferably in the smart card, or alternatively (for example when the memory of the smart card is full) split across the smart card and the smart phone (with or without overlapping, i.e. some entries can be found both in the smart card and in the smart phone).

In case a regular phone book is kept, the contents of the web pages of the web phone book are not necessarily the same as the contents of the regular phone book (there might be different entries in the respective phone books, which can thus differ not only by their format but also by their contents). The web pages of this web phone book can be similar in structure to state-of-the-art web pages used in yellow pages web servers. By default, the web pages of this web phone book can be customized by the operator (e.g. branding), the subscriber being free to customize it differently, as discussed earlier.

Certain web pages of the web phone book can include excerpts downloaded from public web servers such as yellow pages or downloaded from private web servers such as a company's LDAP directory with a web interface (which can contain employees telephone numbers). Such web pages can be downloaded into the smart card and/or into the smart phone (either permanently or only temporarily), using for example downloading means or synchronization means.

Other parts of the web phone book can consist of personal contacts stored as web pages.

While it is possible to keep both phone books (the web phone book and the regular phone book) completely separate (i.e. their contents might be different and independent), the web phone book and regular phone book can also be synchronized, in whole or in part. Some automatic synchronization means can be provided in order to ensure that both phone books contain the same entries, at least for a subset (such as a user defined list of frequently used personal contacts). A possible synchronization method consists in performing any operation requested on one phone book on the other phone book as well. For example, if a new entry is added, modified or removed, it is added to both phone books, modified in both phone books, or removed from both phone books simultaneously. As already indicated, this synchronization can be limited to a subset of the phone books.

Some memory optimization means can be provided for the synchronized subsets of the regular and web phone books, in order to dynamically generate the web phone book from the regular phone book or vice versa (no need to store the same data twice, with different formats).

The memory optimization means can also consist in storing the phone book in a compact internal representation (optionally with data compression), and in converting it upon request either into the web phone book format (web page) or regular phone book format.

The conversion is preferably performed transparently and automatically (when a phone book is accessed, the conversion takes place on the relevant phone book's portion and the accessing entity doesn't even notice that the data has been dynamically converted).

The way phone book entries are displayed, as well as the way one navigates through those entries, is no longer dependent on the smart phone's user interface, but solely on the smart phone's web browser, which is a more standard tool.

According to another aspect of the invention, upon selection of a web phone book entry, a phone call directed towards the selected entry is automatically triggered. This can be achieved through a SIM Toolkit command. This can also be achieved through a special WAP tag inserted in the web page, as known from state of the art for web pages hosted on remote Internet servers and as already described above with the WAP yellow pages example.

According to yet another aspect of the invention, the previous teaching can be extended as follows.

Any web page stored in the smart card can contain at least one element (such as hyperlink or hot spot), which points to an application stored in the smart card (such application being for example a servlet) and which triggers a proactive command such as the dialing of a phone number or can contain at least one WAP tag that triggers the dialing of a phone number.

Any web page stored on a remote Internet server (instead of the smart card) can contain at least one element (such as hyperlink or hot spot), which points to an application stored in the smart card (such application being for example a servlet) and which triggers a proactive command such as the dialing of a phone number.

BRIEF DESCRIPTION OF DRAWINGS

Other features and advantages of the present invention are illustrated in the following drawings, which are by no means limitative. In the drawings.

DETAILED DESCRIPTION

Figure 1:
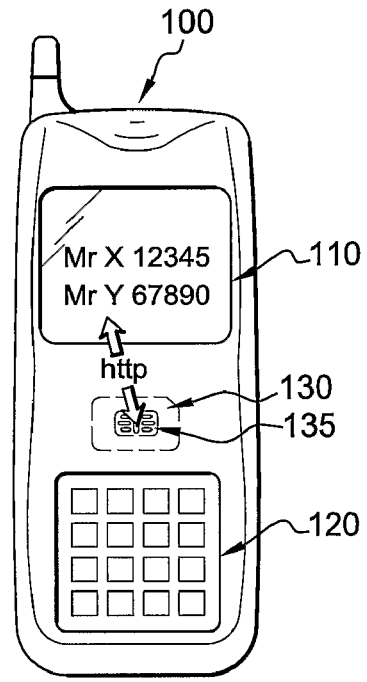
FIG. 1 depicts a smart phone with a web phone book according to the invention

As illustrated on FIG. 1, a smart phone 100 includes a display 110, a keypad 120, and a smart card 130.

The display 110 is used both by the telecommunication unit (e.g. it can indicate, by prompting a specific image, that a phone number is being dialed, it can show the phone number associated with an incoming call etc.), and by the personal computing unit (e.g. it can show the contents of the subscriber's agenda, it can display the contents of a web page that is being visited, etc.).

The keypad 120 is shared between both units too. For example, it can be used to type a phone number, but also to type the URL of a web site that one plans to visit, or to enter the details of a meeting into an agenda application provided in the smart phone.

The smart card 130 is preferably a regular ISO 7816 compliant SIM card. It communicates preferably either through well-known ISO protocols or through newer and faster USB protocols.

The smart card supports a TCP-IP protocol and hosts a web server.

The web server stored in the smart card contains web pages, some of which form a web phone book 135.

The format of the web phone book's web pages can be HTML, WML, XML, or any other suitable format.

The web phone book contains entries, and other web pages stored on the smart card's web server can contain entries too, the concept of entries being known from state of the art (as reminded earlier). An entry includes at least an identifier (such as a person's name), and is associated with at least one phone number.

The web pages and web phone book can be shown on the display 110. On FIG. 1, the display 110 exhibits two web phone book's entries, Mr X associated with a first phone number (12345), and Mr Y, associated with a second phone number (67890).

The subscriber can customize the way the web pages and more specifically the web phone book 135 is displayed (font size, font type, font color, background, etc.) if he's not satisfied with the default options (such as operator's branding, if any).

The selection of a web page or web phone book entry, automatically triggers the execution of an action associated with one of the phone numbers linked to the phone book entry (as with a regular phone book).

The selection of the web phone book entry is performed using the keypad 120 (but could alternatively consist in a click performed with any kind of pointing device known in state of the art), and is detected thanks to the smart phone browser's features (the smart phone manufacturer defines how to perform a click). A proactive logic entity (for example a servlet) comprising at least one proactive command is programmed to be responsive to a triggering signal generated by actuation of the entry or entries. Said proactive logic entity launches the proactive commands when receiving said triggering signal.

In case several numbers are provided for a single entry, one of the numbers is defined as a default number and will be used unless otherwise specified by the subscriber with techniques known in state of the art for regular phone books.

The action of the proactive logic entity can be triggered by a hyperlink of the following type (inserted in the phone book entry), illustrating the use of a servlet as a proactive logic entity:

http://IP-ADRESS:PORT-NUMBER/servlet-action.html, where IP-ADDRESS is the value of the IP address of the smart card (for example 127.0.0.1, i.e. the local IP address since the smart card is inside the smart phone), PORT-NUMBER is the number of the port on which the communication will take place (for example 5050, but other values would work as well).

Parameters can be passed. For example by appending the string: ?Number=12345 to the above URL, one can require 12345 to be dialed by the servlet. By appending ?Number=12345 &texto:"hello" one could send an SMS with the text "hello" to the phone number 12345.

Non-limitative examples of actions that can be automatically executed by the servlet upon entry selection include proactive commands such as:

Setup Call (in order to dial the default or user-selected number of the entry)

Send SMS (in order to send a SMS to the entry's number)

Network commands

SMS can consist of text messages (texto) or data messages (e.g. APDUs, or applet specific data, etc.). Data messages can be used to send information generated by an application hosted inside the smart phone or inside the smart card. For example, it could be used to register the best score or current level (while playing a smart phone game) on a remote server.

Network commands include the Send SS command (SS stands for Supplementary Services) which can be used for example for call forwarding, and which consists in dialing special numbers (numbers with wildcards such as '*' and '#'). Network commands also include the Send USSD commands. USSD stands for Unstructured Supplementary Service Data. USSD consists in a capability built into the GSM standard for support of transmitting information over the signaling channels of the GSM network. USSD provides session-based communication, enabling a variety of applications, unlike SMS, which is a store-and-forward, transaction-oriented technology.

Figure 2:
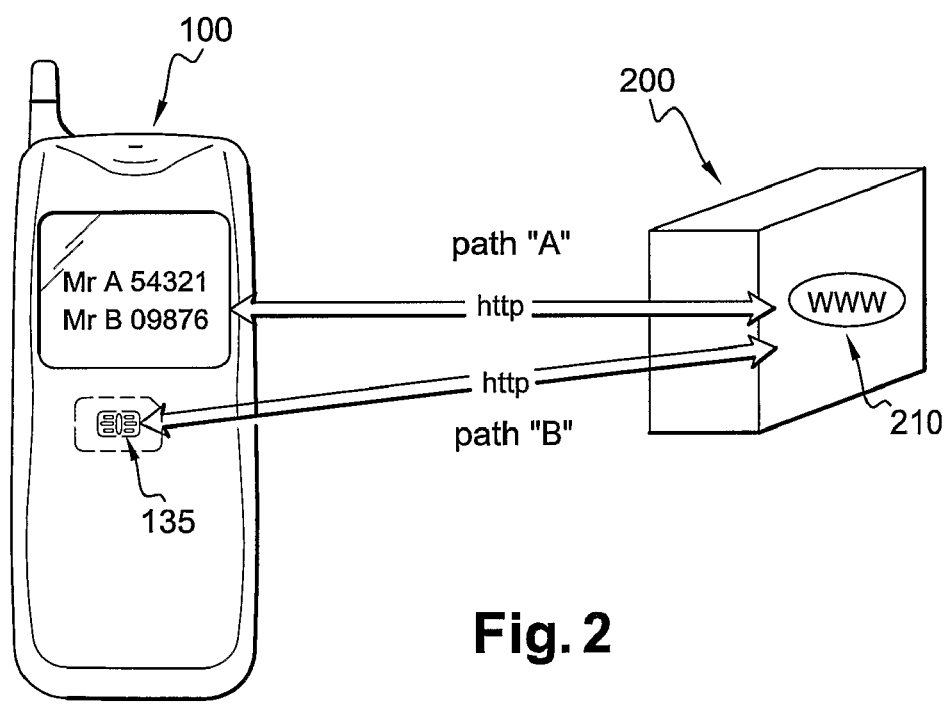
FIG. 2 depicts a smart phone interacting with a remote web server

As illustrated in FIG. 2, the smart phone 100 can also interact with a remote web server 200, which can host a yellow pages service 210.

The smart phone 100 enables browsing through the yellow pages as known from state of the art (path A), and can also store (permanently or temporarily) selected parts of the entries into the smart card's phone book 135 (path B).

The invention claimed is:

1. A system comprising:

a smart phone comprising a web phone book, the web phone book comprising a plurality of web pages for personal contacts for a subscriber of the smart phone; and a smart card configured to store at least a portion of the plurality of web pages of the web phone book, wherein the smart phone comprises a web browser and a display configured to display the plurality of web pages of the web phone book, and wherein at least one proactive logic entity is present in the smart card, wherein the at least one proactive logic entity is configured to respond to selection of at least one entry on a web page of the web phone book, and wherein the proactive logic entity comprises at least one proactive command configured to be sent from an application stored on the smart card, as a master entity, to the smart phone, as a slave entity, and to direct the smart phone to dial a phone number contained in the at least one selected entry of the web phone book, wherein the at least one proactive command is launched by the proactive logic entity when a triggering signal, generated in response to selection of the at least one entry on the web page, is received.

2. The system of claim 1, wherein the smart card is configured to temporarily store the web page and wherein the web page stored in the smart card is accessible via the web browser.

3. The system of claim 1, wherein at least one element linked to the at least one selectable entry is passed, after selection of the at least one selectable entry, as a parameter to the at least one proactive logic entity.

4. The system of claim 1, wherein the at least one proactive logic entity comprises a servlet.

5. The system of claim 1, wherein the at least one proactive logic entity is configured to launch at least one action selected from a group consisting of: dialing the phone number, sending an SMS, and sending network command.

6. The system of claim 1, wherein the web phone book comprises at least part of a remote web phone book and wherein the at least part of the remote web phone book is downloaded from the Internet and stored in the smart card.

7. The system of claim 1, wherein at least a portion of the web phone book and at least a portion of a regular phone book are synchronized.

8. The system of claim 7, wherein an optimization unit operates a single storage comprising the web phone book and the regular phone book such that there is no duplication of entries in the single storage unit.

9. A smart phone, comprising: a smart card configured to store at least one proactive logic entity, and at least a portion of a plurality of web pages of a web phone book associated with a smart phone; a web browser; and a display, wherein the web browser and the display are configured to display the web phone book comprising the plurality of web pages for storing personal contacts of a subscriber of the smart phone, the plurality of web pages comprising at least one selectable entry, wherein the at least one proactive logic entity is configured to respond to selection of the at least one selectable entry on a web page of the web phone book, and wherein the proactive logic entity comprises at least one proactive command configured to be sent from an application stored on the smart card, as a master entity, to the smart phone, as a slave entity, and to direct the smart phone to dial a phone number contained in the selected entry of the web page, wherein the at least one proactive command is launched by the proactive logic entity when a triggering signal, generated in response to selection of the at least one entry on the web page, is received.

10. A smart card, comprising:
at least a portion of a plurality of web pages of a web phone book associated with a smart phone; and
at least one proactive logic entity, wherein the at least one proactive logic entity is configured to respond to selection of at least one selectable entry of a web page in the web phone book,
wherein the smart card is configured to interface with the smart phone comprising the web phone book,
wherein the smart phone comprises a web browser configured to display the web phone book on a display of the smart phone, and
wherein the proactive logic entity comprises at least one proactive command configured to be sent from an application stored on the smart card, as a master entity, to the smart phone, as a slave entity, and to direct the smart phone to dial a phone number stored in the at least one selectable entry on the web page, wherein the at least one proactive command is launched by the proactive logic entity when a triggering signal, generated in response to selection of the at least one selectable entry on the web page, is received.

11. The smart card of claim 10, wherein the at least one proactive logic entity, in response to selection, is configured to launch at least one action selected from a group consisting of: dialing the phone number, sending an SMS, and sending network command.

\* \* \* \* \*

UNITED STATES PATENT AND TRADEMARK OFFICE
CERTIFICATE OF CORRECTION

PATENT NO. : 8,276,809 B2  Page 1 of 1
APPLICATION NO. : 11/884246
DATED : October 2, 2012
INVENTOR(S) : Didier Hugot et al.

It is certified that error appears in the above-identified patent and that said Letters Patent is hereby corrected as shown below:

On the Title page, Item (56) References Cited,

US-20040172391-A1 09-02-2004 JOSENHANS should be added.

Signed and Sealed this
Fifteenth Day of January, 2013

David J. Kappos
*Director of the United States Patent and Trademark Office*